Aug. 18, 1959 R. BIRMANN 2,899,797
TURBOCHARGER FOR INTERNAL COMBUSTION ENGINES
Filed Feb. 3, 1956 3 Sheets-Sheet 1
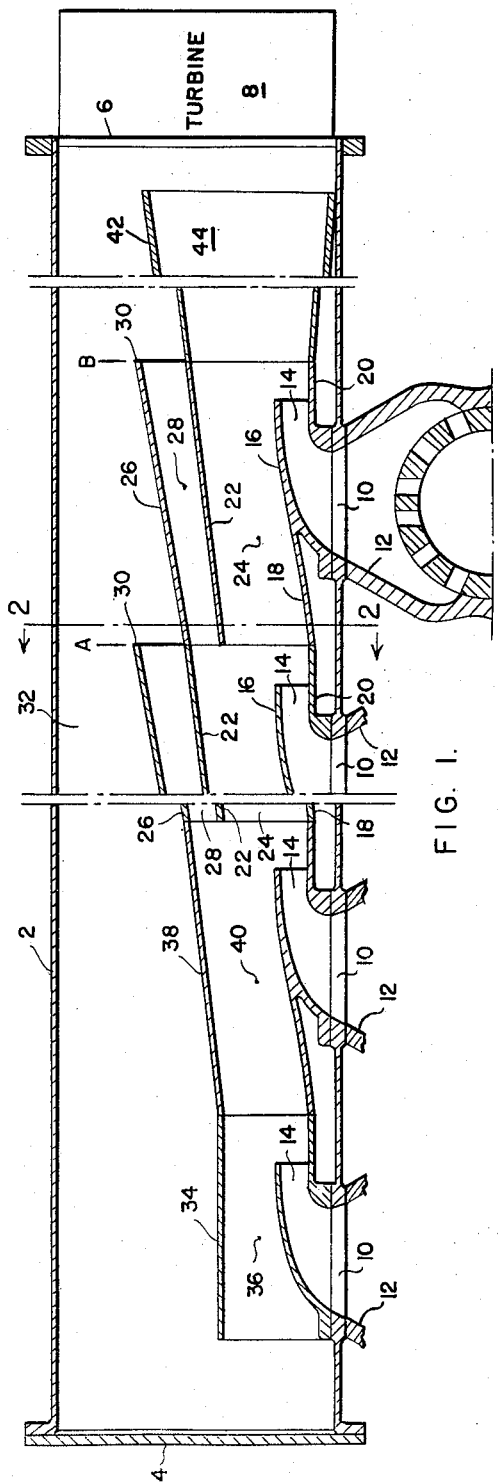
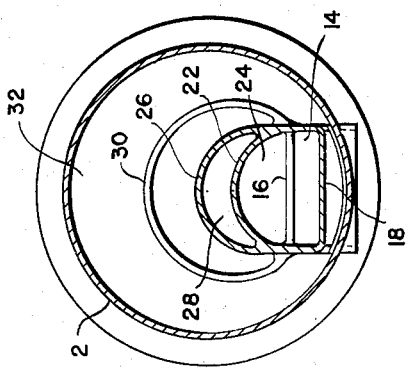
INVENTOR.
RUDOLPH BIRMANN
BY
ATTORNEYS Aug. 18, 1959 R. BIRMANN 2,899,797
TURBOCHARGER FOR INTERNAL COMBUSTION ENGINES
Filed Feb. 3, 1956 3 Sheets-Sheet 2

INVENTOR.
RUDOLPH BIRMANN
BY
ATTORNEYS

Aug. 18, 1959  R. BIRMANN  2,899,797
TURBOCHARGER FOR INTERNAL COMBUSTION ENGINES
Filed Feb. 3, 1956  3 Sheets-Sheet 3

*INVENTOR.*
RUDOLPH BIRMANN
BY
ATTORNEYS

United States Patent Office 2,899,797
Patented Aug. 18, 1959

2,899,797

TURBOCHARGER FOR INTERNAL COMBUSTION ENGINES

Rudolph Birmann, Newtown, Pa., assignor to De Laval Steam Turbine Company, Trenton, N.J., a corporation of New Jersey Application February 3, 1956, Serial No. 563,347

8 Claims. (Cl. 60—13)

This invention relates to turbochargers for internal combustion engines, and while the invention is applicable to four-cycle engines of the spark ignition type, it is particularly advantageous in connection with two-cycle diesel engines.

In my application Serial No. 360,500, filed June 9, 1953, there are discussed, inter alia, provisions for handling engine exhaust gases to utilize as much as possible the pulsating portion of the exhaust energy from the engine to drive the turbine of a turbocharger, and to bring about a greater difference between the intake manifold pressure and the exhaust pressure against which the engine must discharge. In accordance with the disclosure of said application the various engine cylinders discharge through nozzles arranged in series in such a fashion that the effective back pressure for the engine, during the scavenging periods of the cylinders, becomes low. Further, the arrangement is such as to minimize pulsations in the gases being fed to the turbine of the turbocharger. The intermittent flow is transformed into a substantially steady flow by the use of the energy in the exhaust pulsations to create and maintain high velocity in a straight passage that extends along the entire length of the engine and is segregated from the remainder of the exhaust manifold in which only relatively low velocity prevails. The aforementioned high velocity passage is open at both ends to the low velocity space and it terminates at its downstream end in a diffuser. The result of the arrangement is that there is provided recirculation of the gases with a lower static pressure in the high velocity passage than the pressure outside thereof, which means that the engine can discharge against a relatively low back pressure while the turbine receives the benefit of a higher preturbine pressure, higher by the amount of the velocity head. This arrangement works out exceedingly well in practice, very substantial recovery of the energy in the exhaust pulsations being achieved, to the extent that it is possible to operate a two-cycle engine without using its positive displacement blower, which constitutes its normal source of air supply, or any other source of air supply except that induced by the aforedescribed flow phenomenon, which in this case was used to produce a negative static pressure in the high velocity passage, thus causing the flow of air into the engine to be at atmospheric pressure.

There are, however, certain undesirable features of the arrangement just described. The high velocity passage has to be tapered from the small end, where the recirculating flow enters, to the large end where the recirculating flow plus the engine flow discharge. This makes the construction expensive because of the non-uniformity of the parts involved. Furthermore, the single diffuser at the downstream end of the high velocity passage must be quite large and therefore occupies more space than desirable. The necessary large dimensions of the diffuser require making the entire size of the exhaust manifold excessively large.

It is the general object of the present invention to improve the pulse-converting system of the type just described to secure a less expensive construction and a less bulky one, as well as to reduce friction losses. In brief, it has been found unnecessary to accomplish the aforedescribed diffusing in a single diffuser located at the end of the high velocity passage, but diffusing can be accomplished by providing a series of suitable diverging passages branching off from the high velocity passage along its entire length. The end result is that by adding high velocity flows from the engine all along the high velocity passage and removing, for the purpose of diffusion, high velocity flows, also all along the high velocity passage, this passage no longer has to be of increasing cross-section but can have an approximately uniform passage area throughout its entire axial extent. This greatly simplifies the construction and also the standardization on engines having different numbers of cylinders. Furthermore, the average length over which any flow particle has to travel at high velocity is shortened and, consequently, friction losses, which are the major losses in the device, are reduced, correspondingly improving the recovery of energy in the exhaust pulsations. Desirably, the recirculating flow, which acts as a "gas fly wheel" and is essential for the achievement of the transformation of an instationary flow phenomenon into a stationary one, should be not less than 25% and not more than 75% of the engine flow. If this recirculating flow is too small the "gas fly wheel" effect is too small, and consequently the flow in the high velocity passage is not steady enough and excessive losses occur as the result of momentum transfer. If, on the other hand, the recirculating flow is too great, the high velocity passage areas are large, and the friction losses become excessive. In addition thereto, excessive losses are incurred in the process of diffusing and reaccelerating the recirculating flow.

In accordance with the present invention the requirements for optimum operation are secured.

The foregoing general objects of the invention and others particularly relating to details of construction and operation will become apparent from the following description read in conjunction with the accompanying drawings in which:

Figure 1 is a sectional view showing a pulse-converter manifold adapted for association with an engine having a single bank of cylinders;

Figure 2 is a transverse section taken on the plane indicated at 2—2 in Figure 1;

Figure 4:
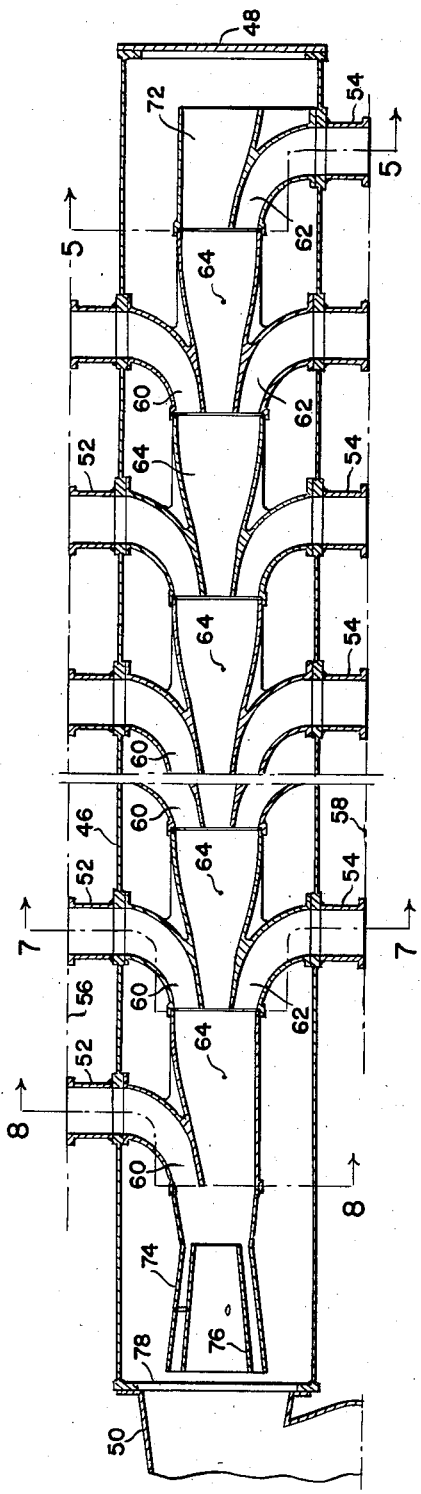
Figure 4 is a developed section of the manifold of Figure 3 taken on the broken surface indicated at 4—4 in Figure 7.

Referring first to Figures 1 and 2, the manifold shown therein is of a type suitable for association with an engine having, for example, six or eight cylinders in line, the figure being broken away in its central portion where the various parts are merely duplicated. As will appear more clearly hereafter, various sections of the manifold are mechanical duplicates of each other, this providing relatively inexpensive construction and adaptability of the same parts to engines of different numbers of cylinders. The manifold comprises a cylindrical housing 2 which is closed at one end 4 and open at its other end 6 for delivery of the engine exhaust gases to the turbine 8 of a turbocharger which may be of any desired type but preferably is of the type disclosed in my prior application, Serial No. 360,500, referred to above and which delivers air to the engine for its operation in usual fashion. The housing 2 is provided with ports 10 arranged to communicate with the exhaust passages 12 individual to the various engine cylinders.

The ports 10 communicate with nozzles 14 receiving the exhaust gases and providing conversion of energy thereof into high velocity of jets directed toward the right in Figure 1 in substantially axial direction. The arrangement shown, involving the bolting of the housing 2 directly to the exhaust ports of the engine contributes greatly to proper operation in view of the following situation:

The amount of energy that can be recovered from the energy in the exhaust pulsations depends to a very great extent on the volume of the passages between the point at which the exhaust gases discharge from a cylinder and the point where the energy conversion is effected. If this volume is large, the energy in the exhaust pulsations is dissipated by a plenum chamber effect, whereas if it is very small good energy recovery can be achieved. In a conventional blowdown system, long exhaust branch manifolds are unavoidable, and therefore relatively poor recovery of the energy in the exhaust pulsations is obtained (in addition to the losses incurred from the emptying and filling of the stationary and rotating turbine passages). In accordance with the present invention the aforementioned critical volumes of the exhaust passages can be made an absolute minimum, leading to good recovery of the energy in the exhaust pulsations, despite the fact that this recovery is accomplished by means of a process that entails relatively high losses due to momentum transfer, diffusion, and reacceleration.

The portions 16 of the nozzle walls which are most remote from the ports 10 merge smoothly into walls 18 which in turn merge smoothly into the portions 20 of the nozzle walls which are adjacent to the ports 10. Walls 22 provide in conjunction with the walls 16 and 18 gas passages 24 while exteriorly of these walls 22 are other walls 26 which merge with the walls 22 and provide diffuser passages 28 having discharge ends 30. Exteriorly of these is the passageway 32 within the housing 2.

The construction just described will be particularly evident from the section constituting Figure 2, which shows the association of the various passages and what has been described applies to the passages which may be considered associated with all of the cylinders of the engine except for the first two. In the case of the first cylinder at the extreme left of Figure 1 a wall 34 provides a passageway 36 receiving gas recirculating through the passageway 32, the passage 36 discharging into the passage 40 which is delimited by the wall 38. The final one of the passages 24 delivers gases into the diffuser 44 which is provided by the divergent wall 42. The diffuser 44 discharges into the right hand end of the housing 2 and the entrance passage of the turbine 8.

As will be evident from Figure 1 substantial duplication occurs in the elements involved, the walls being desirably welded to each other to form proper bonded passages to involve operation as follows:

Assume operation taking place, gases recirculating at relatively low velocity through the passageway 32 from the right toward the left in Figure 1 enter the passage 36, where they become accelerated to a high velocity, and then flow to the passage 40, joining in the latter gases flowing from the most left hand nozzle 14. The gases leaving the passage 40 divide, some of these gases passing into the first diffuser 28 in which their velocity is reduced with corresponding rise of pressure and from which they are discharged into the passageway 32. The remainder of the gases flow into the most left hand passage 24 illustrated where they are joined by gases delivered from the second nozzle 14. What has just been described is then repeated through the intermediate portions of the pulse converter involving a series of structures indicated between the lines A and B, some of the gases in each portion being delivered through a corresponding diffuser 28 while others proceed into the next passage 24. Finally, the last passage 24 delivers its gases into the diffuser 44 which also receives gases from the final nozzle 14. Of the gases which pass into passage 32, some are delivered to the turbine 8 while others take part in the recirculation toward the left through the passageway. Velocities in passageway 32 are low, and the total flow automatically distributes itself into recirculating flow and delivered flow, the size of all high velocity and low velocity passages being chosen according to the requirements of normal operation of the engine.

The passages 40 and 24 form a continuous through-passage having approximately constant cross-sectional area, the successive passages 24, at least, being of substantially the same dimensions, this being permissible by reason of the fact that the gas which might otherwise accumulate is bled off through the successive diffusers 28. In operation, high velocity (approximately of a steady nature) is maintained in the passages 36, 40 and 24. This high velocity is produced and maintained by the action of the gases issuing from the nozzles 14, each of which is associated with an engine cylinder and therefore discharges the engine exhaust gases intermittently. During the initial period of the discharge (which corresponds to the so-called blowdown period of the respective cylinder), the velocity is very high, much higher than the mean velocity in passages 36, 40 and 24. During the remainder of the active period of any one nozzle passage 14 (corresponding to the scavenging period of the respective cylinder), the discharge velocity is lower. Because the high velocity passages 36, 40 and 24 communicate with the low velocity passageway 32, through diffusers 28 and 44, the same total pressure prevails in both high and low velocity passages; however, the static pressure in the high velocity passages is much lower than the static pressure in the passageway 32. The result is that during the scavenging periods of the engine cylinders low pressure exists in the cylinder discharge passages, which provides the necessary pressure drop for flow through the engine, even if the air pressure at the inlet ports of the engine cylinders is relatively low. At the same time, since the static pressure in the passageway 32 is relatively high, the turbine receives high pressure for its operation in spite of the low back pressure against which the engine operates. The difference between turbine admission pressure and engine back pressure is derived from the conversion of blowdown energy (that is, the energy in the exhaust pulsations) into a pressure rise. Furthermore, by reason of the recirculation that occurs, the pulses resulting from the cylinder discharges are effectively smoothed out, so that the flow to the turbine 8 is substantially uniform that is, of a steady nature, best suited for the achievement of maximum turbine efficiency.

It will be noted that on the average the gas discharged at high velocity at any nozzle 14 has a relatively short path of flow at high velocity through the passages 36, 40 and 24 with a resulting diminution of frictional losses. As contrasted with the arrangement described in my prior application referred to above, it is not necessary that the total of the gases should be subjected to diffusion in a single diffuser, the total diffuser volume being made up of the volumes of the separate diffusers 28 plus that of the final diffuser 44. As a consequence the diffuser 44 may have relatively small dimensions as indicated and the entire pulse-converter may be readily dimensioned, for a particular engine operating under its normal conditions, that the recirculating flow may be proportioned as stated above to be desirable, i.e., not more than 75% nor less than 25% of the engine flow. If kept within these limitations, a condition approximating steady flow is well secured without incurring excessive losses in the process of diffusing and reaccelerating the recirculating flow.

Figure 3:
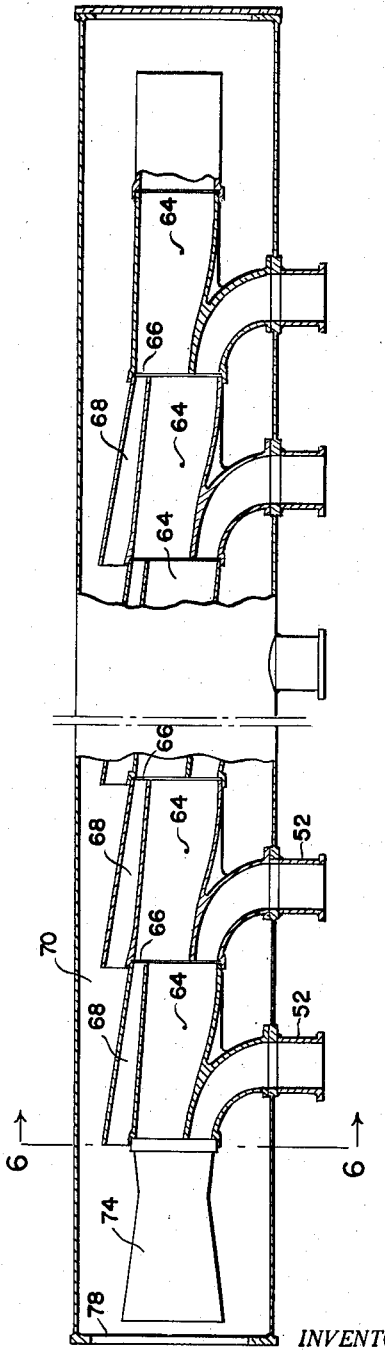
Figure 3 is a sectional view showing a pulse-converter manifold suitable for association with two banks of cylinders of a V-type engine, the section being taken on the broken surface indicated at 3—3 in Figure 7.
Figure 5:
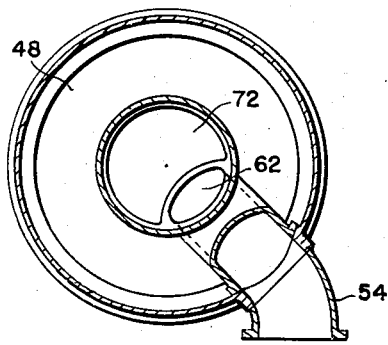
Figure 5 is a transverse section taken on the broken surface indicated at 5—5 in Figure 4.
Figure 6:
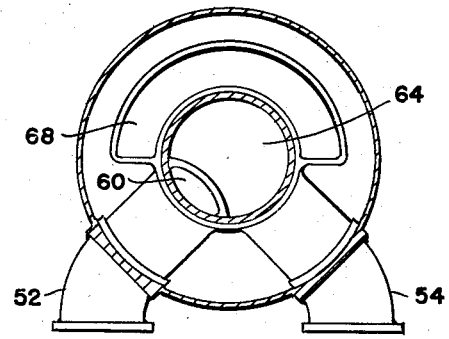
Figure 6 is a transverse section taken on the plane indicated at 6—6 in Figure 3.
Figure 7:
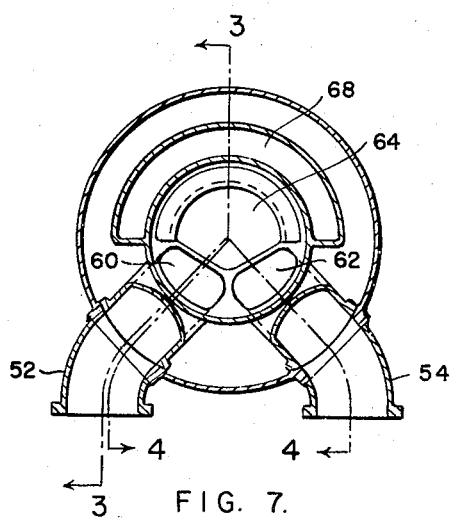
Figure 7 is a transverse section taken on the broken surface indicated at 7—7 in Figure 4.
Figure 8:
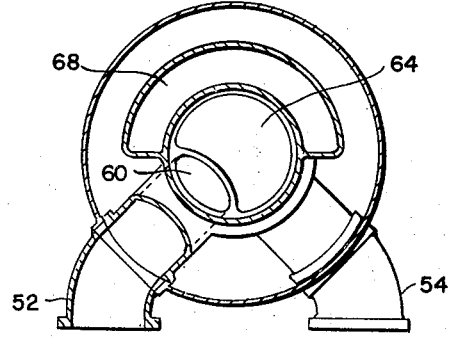
Figure 8 is a transverse section taken on the broken surface indicated at 8—8 in Figure 4.

Figures 3 to 8, inclusive, show a pulse-converter which is basically similar to that shown in Figures 1 and 2 but provided for use in an engine having two banks of cylinders. What is illustrated in these figures is suitable, for example, for a sixteen cylinder engine with eight cylinders in each of the two banks. The various sections will make clear the details of construction showing how the various passages including the diffusers are formed. The central portion of the converter is broken away in each of Figures 3 and 4 wherein duplications of the elements shown exist.

The housing 46 is closed at one end 48 and open at its other end at 78 to deliver gases to the inlet passage of the turbine 50 of a turbocharger which may be of the type described in my prior application. Connections 52 and 54 receive gases from the exhaust passages of the cylinders of the two banks, the cylinder blocks of the two banks being indicated at 56 and 58. During the blowdown period, nozzles 60 and 62 discharge the gases from the cylinders in the form of high velocity jets into the passages 64 which are in axial alignment and constitute the high velocity passage of the pulse-converter. At their respective ends 66 the passages 64 bleed portions of the gases into the diffusers 68 which are shaped as will be evident particularly from Figures 3, 7 and 8, the diffuser passages being divergent to provide transformation of velocity into pressure. The diffusers discharge into the passageway 70 in which recirculation occurs toward the right as viewed in Figures 3 and 4, the recirculating gases reentering the high velocity passageway through the converging receiving passage 72. The final, left hand, passage 64 and final, left hand nozzle 60 discharge into a diffuser 74 of divergent form which is provided with a splitter cone 76. As will be evident from the figures, there is in this modification, also, considerable duplication of parts providing the passages, such duplication being possible by reason of the fact that the gases do not accumulate along the length of the converter due to their being bled off throughout its length through the various diffusers. The operation and the advantages are the same as those described in connection with the modification shown in Figures 1 and 2. In this case also proportioning may be readily achieved for particular conditions of engine operation so as to secure the desirable recirculation within the range of 25% to 75% of the engine flow.

It will be evident that various changes in details of what has been described may be made without departing from the invention as defined in the following claims.

What is claimed is:

1. In combination with an internal combustion engine of reciprocating type, a turbocharger comprising a turbine and compressor driven thereby, means for leading exhaust gases from said engine to said turbine; said means comprising means defining a first elongated passage having an inlet end, means defining a second passage extending along the length of said first passage, nozzles receiving exhaust gases from the engine and discharging said gases at high velocity in the same direction, away from said inlet end, into said first passage, a plurality of diffusers distributed along the length of said first passage and receiving gases therefrom and discharging directly into said second passage at locations distributed along the length thereof, and means providing communication between said second passage and the inlet end of said first passage; and means for leading air from said compressor to said engine.

2. A combination in accordance with claim 1 in which the diffusers correspond in number to said nozzles.

3. A combination in accordance with claim 1 in which the diffusers are aligned with the direction of flow of gases in said first passage so as to receive them without substantial change of direction of flow.

4. A combination in accordance with claim 2 in which the diffusers are aligned with the direction of flow of gases in said first passage so as to receive them without substantial change of direction of flow.

5. A combination in accordance with claim 1 in which the final diffuser in the direction of flow is substantially in axial alignment with said first passage.

6. A combination in accordance with claim 2 in which the final diffuser in the direction of flow is substantially in axial alignment with said first passage.

7. A combination according to claim 1 in which said first passage has approximately constant cross-sectional area throughout at least the major portion of its extent.

8. A combination according to claim 2 in which said first passage has approximately constant cross-sectional area throughout at least the major portion of its extent.

References Cited in the file of this patent

UNITED STATES PATENTS 2,406,656    Birmann _____ Aug. 27, 1946